(12) United States Patent
Aoki

(10) Patent No.: US 10,953,588 B2
(45) Date of Patent: Mar. 23, 2021

(54) INJECTION MOLD FOR INJECTION STRETCH BLOW MOLDING MACHINE, METHOD FOR MOLDING PREFORM, PREFORM, METHOD FOR MOLDING CONTAINER, AND CONTAINER

(71) Applicant: A. K. Technical Laboratory, Inc., Nagano (JP)

(72) Inventor: Shigeto Aoki, Nagano (JP)

(73) Assignee: A.K. Technical Laboratory, Inc., Nagano (JP)

( * ) Notice: Subject to any disclaimer, the term of this patent is extended or adjusted under 35 U.S.C. 154(b) by 165 days.

(21) Appl. No.: 15/564,583

(22) PCT Filed: Jun. 13, 2016

(86) PCT No.: PCT/JP2016/002855
§ 371 (c)(1),
(2) Date: Oct. 5, 2017

(87) PCT Pub. No.: WO2017/098673
PCT Pub. Date: Jun. 15, 2017

(65) Prior Publication Data
US 2018/0079127 A1    Mar. 22, 2018

(30) Foreign Application Priority Data

Dec. 11, 2015  (JP) .............................. JP2015-242217
May 26, 2016  (JP) .............................. JP2016-105539

(51) Int. Cl.
*B29C 49/06*  (2006.01)
*B29C 45/26*  (2006.01)
(Continued)

(52) U.S. Cl.
CPC ............ *B29C 49/06* (2013.01); *B29C 45/261* (2013.01); *B29C 45/2612* (2013.01);
(Continued)

(58) Field of Classification Search
None
See application file for complete search history.

(56) References Cited

U.S. PATENT DOCUMENTS 5,620,650 A   4/1997 Nakajima et al.
5,679,306 A   10/1997 Nakajima et al.
(Continued)

FOREIGN PATENT DOCUMENTS

CN   1112482 A   11/1995
CN   101454141 A   6/2009
(Continued)

*Primary Examiner* — Monica A Huson
(74) *Attorney, Agent, or Firm* — Verrill Dana, LLP

(57) ABSTRACT

According to the present invention, in order to improve the productivity of an injection stretch blow molding machine, when a core mold is lifted during mold opening at an injection molding part of the injection stretch blow molding machine, stress is dispersed so as not to concentrate at an area where the thickness changes between a preform opening and a preform body so that the preform body is inhibited from being lifted at a skin layer formed in the area where the thickness changes between the preform opening and the preform body. In a preform (30) where a skin layer (34) at the surface has a lower temperature than a middle layer (35) so as to allow a preform body (32) and a preform bottom (33) to expand and deform from the inside of the preform toward the outside of the preform, the skin layer (34) bridging between the inner surface of the preform body (32) and the inner surface of the preform opening (31) is formed in a tapered shape that opens upward at an outward slant with respect to an extension line (38) of the inner surface of the preform body (32) extending above the skin layer (34) so that, during the lifting of the core mold, the stress exerted from the preform body (32) is dispersed at a stress dispersing plane section (39) formed with the skin layer (34).

6 Claims, 11 Drawing Sheets

(51) Int. Cl.
*B29C 49/48* (2006.01)
*B29C 49/64* (2006.01)
*B29C 45/78* (2006.01)
*B29C 49/12* (2006.01)
*B29C 49/36* (2006.01)
*B29K 105/00* (2006.01)
*B29B 11/08* (2006.01)
*B29K 67/00* (2006.01)
*B29L 31/00* (2006.01)

(52) U.S. Cl.
CPC ............ *B29C 45/78* (2013.01); *B29C 49/062* (2013.01); *B29C 49/12* (2013.01); *B29C 49/36* (2013.01); *B29C 49/48* (2013.01); *B29C 49/6454* (2013.01); *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/14366* (2013.01); *B29B 2911/14426* (2013.01); *B29C 45/2618* (2013.01); *B29K 2067/003* (2013.01); *B29K 2105/258* (2013.01); *B29L 2031/7158* (2013.01)

(56) References Cited

U.S. PATENT DOCUMENTS

2006/0065992 A1* 3/2006 Hutchinson ............ B29C 43/08
264/45.1
2009/0274789 A1 11/2009 Kobayashi et al.

FOREIGN PATENT DOCUMENTS

| | | |
|---|---|---|
| JP | S55146718 A | 11/1980 |
| JP | S5186770 U | 7/1997 |
| JP | H11188779 A | 7/1999 |
| JP | H11208630 A | 8/1999 |
| JP | 2000043130 A | 6/2007 |
| JP | 2007152557 A | 6/2007 |
| JP | 2011000815 A | 1/2011 |
| JP | 2013107397 A | 6/2013 |

* cited by examiner

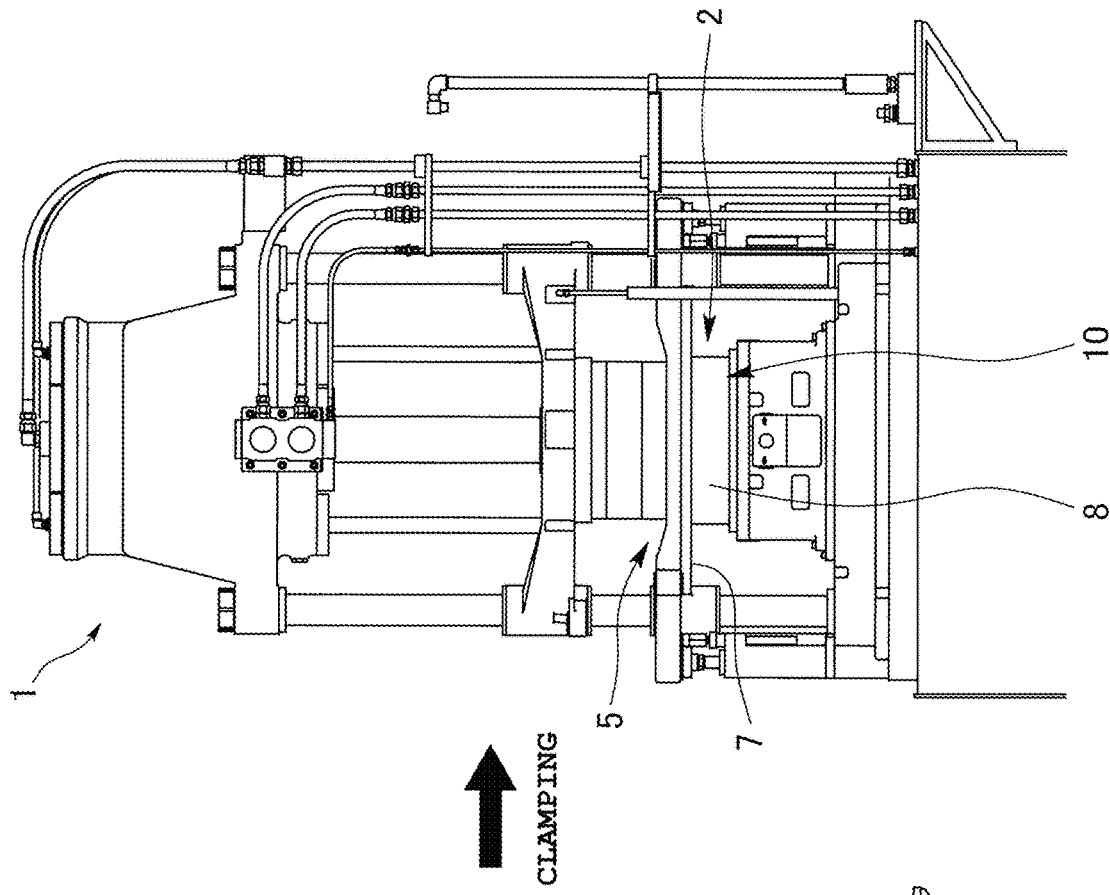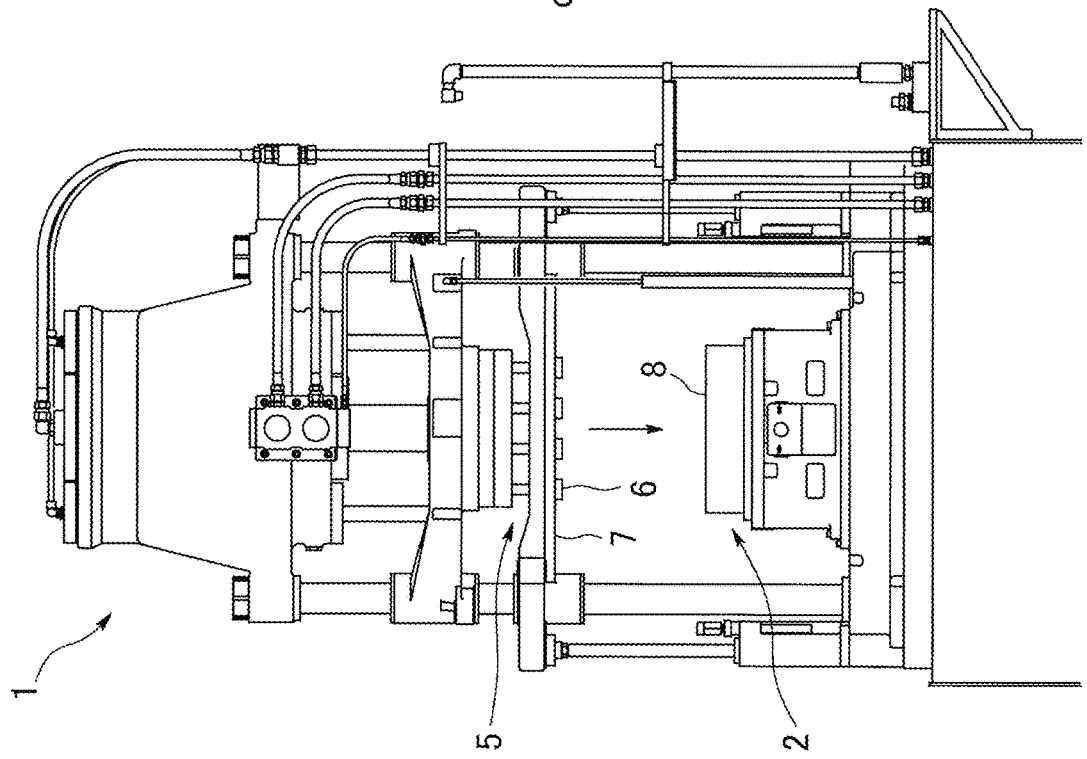

INJECTION MOLD FOR INJECTION STRETCH BLOW MOLDING MACHINE, METHOD FOR MOLDING PREFORM, PREFORM, METHOD FOR MOLDING CONTAINER, AND CONTAINER

TECHNICAL FIELD

The present invention relates to an injection mold for injection stretch blow molding machine, method for molding preform, preform, method for morlding container, and container.

BACKGROUND ART

Conventionally, injection stretch blow molding machines are used to mold containers. The injection stretch blow molding machine is provided with three stations, i.e. an injection molding unit into which a molten resin is fed from a connected injection device, a stretch blow molding unit for molding a preform molded by the injection molding unit into a container, and an ejection unit for transferring the container molded by the stretch blow molding unit out of the machine.

Furthermore, in some of the injection stretch blow molding machines, the three stations are disposed in the same circumference at the same angular intervals, and a rotating plate unit having a rotating plate, which transfers the molded preform and container by circular movement, is provided above the three stations.

The aforementioned rotating plate of the injection stretch blow molding machine has lip molds on its bottom surface. The lip mold is used for forming an outer peripheral surface of a preform mouth portion, and for transferring the molded preform and container by catching the mouth portion of the preform.

As described above, the injection molding unit, the stretch blow molding unit, and the ejection unit are disposed about a rotational axis of the rotating plate at the same angular intervals (120 degrees). The rotating plate stops and the rotating plate unit descends, whenever the rotating plate turns a certain rotation angle (120 degrees). Whenever the rotating plate unit descends, the lip molds provided on the bottom surface of the rotating plate correspond to the injection molding unit, the stretch blow molding unit, and the ejection unit. The descent of the lip mold forms an injection molding mold in the injection molding unit. The descent of the lip mold forms a stretch blow molding mold in the stretch blow molding unit.

For example, as described in Patent Literature 1, the injection molding mold formed in the injection molding unit is constituted of a combination of the descended lip mold, a cavity mold fixed in the injection molding unit, and a core mold that is movable upward and downward in the injection molding unit. When the aforementioned rotating plate unit descends, the lip mold is overlaid on the cavity mold fixed in the injection molding unit, and the core mold, which is movable upward and downward in the injection molding unit, is inserted into the cavity mold through the lip mold. By clamping the molds, preform formation space that is enclosed by the lip mold, the cavity mold, and the core mold is formed.

By feeding a resin injected from the injection device into the aforementioned preform formation space so as to fill the preform formation space with the resin, a preform is molded. After the order of several seconds has elapsed from the injection of the resin, the lip mold as well as the core mold ascends (the rotating plate unit ascends) and opens (the molds are apart), so that the molded preform is moved to an upper portion of the injection molding unit together with the lip mold.

The lip mold has the function of holding and transferring a molded preform, and the function of holding a container molded in the next molding stage, i.e., the stretch blow molding unit and transferring the container to the ejection unit, as well as forms an outer peripheral surface of a mouth portion of the preform as a part of the injection molding mold. The rotating plate of the rotating plate unit turns at a certain rotation angle and stops such that the lip molds are situated in positions corresponding to the aforementioned three stations, and the rotating plate unit ascends and descends. A preform transferred by the lip mold is sent from the injection molding unit to the stretch blow molding unit, and is molded into a container by stretch blow molding. The container formed in the stretch blow molding unit by stretch blow molding is transferred to the ejection unit with the lip mold for holding the mouth portion of the container. In the ejection unit, the lip mold releases the hold of the mouth portion of the container to send the molded container out of the machine.

CITATION LIST

Patent Literature

Patent Literature 1: Japanese Patent Application Laid-Open No. Hei. 11-188779

SUMMARY OF INVENTION

Technical Problem

In the conventional injection molding mold structured in the injection molding unit of the aforementioned injection stretch blow molding machine, the preform formation space is constituted of a preform mouth portion forming portion, a preform body forming portion that is continuous with the preform mouth portion forming portion and has a gap width that is uniform and wider than the gap width of the preform mouth portion forming portion, and a preform bottom forming portion that is continuous with the preform body forming portion and is located on the side of a gate of a resin inlet port at its bottom end.

In a preform, a preform body and a preform bottom are required to have a large amount of resin, because of being expanded largely by stretch blow molding. Thus, the gap widths of the aforementioned preform body forming portion and the preform bottom forming portion in the preform formation space are wider than the gap width of the aforementioned preform mouth portion forming portion in the preform formation space. On the other hand, since a preform mouth portion has the same shape as a container mouth portion, the gap width of the preform mouth portion forming portion in the preform formation space is narrower than the gap widths of the preform body forming portion and the preform bottom forming portion.

Note that, there is a case where the preform mouth portion forming portion is provided with a screw forming portion, a flange forming portion, or the like that is convex outward. Even in the case, the preform mouth portion forming portion itself does not change and has a narrow gap width.

As described above, since the gap width of the preform body forming portion, which is continuous with the preform mouth portion forming portion, is wider than the gap width of the preform mouth portion forming portion in the preform formation space, the gap width of the preform body forming portion is conventionally made narrow at a portion in the vicinity of the preform mouth portion forming portion. To be more specific, as shown in Patent Literature 1, a preform body inner surface forming portion of the core mold is tapered in the vicinity of a preform mouth portion inner surface forming portion.

By the way, to increase the molding efficiency in the injection stretch blow molding machine having the injection molding mold of the aforementioned structure, a molding cycle of a preform in the injection molding unit is required to be reduced, and it is studied to accelerate mold opening timing, in other words, ascent timing of the core mold.

In the preform that is formed by filling the aforementioned preform formation space of the injection molding mold with the resin, a surface layer that is in contact with the injection molding mold (the lip mold, the cavity mold, and the core mold) is a skin layer having higher stiffness due to temperature reduction than a middle layer that is not in contact with the injection molding mold. The skin layer is also formed in a surface layer that is in contact with the aforementioned tapered portion of the preform mouth portion inner surface forming portion of the core mold.

When the core mold is caused to ascend in conventional timing, a preform body corresponding to the preform body inner surface forming portion of the core mold almost ascends in a following manner, and a stress concentrates on the preform at a portion corresponding to the aforementioned tapered portion of the core mold. However, the skin layer formed in the tapered portion resists the stress, and therefore the preform body is prevented from ascending.

However, when the core mold is caused to ascend in early timing, the skin layer formed in the tapered portion may easily have insufficient stiffness. When the core mold ascends in this state, the stress transferred due to the following ascent of the preform body collapses the skin layer in the tapered portion. As a result, the preform body ascends in a following manner and collides against the preform mouth portion, and thus the shape of the entire preform collapses. Thus, there is a problem that the preform cannot be used in the next stretch blow molding stage. For this reason, the mold opening timing cannot be accelerated, and the molding efficiency cannot be increased.

Considering the aforementioned circumstances, a subject of the present invention is to prevent the following ascent of the preform body in the injection molding mold formed in the injection molding unit of the injection stretch blow molding machine, when ascending the core mold to open the mold, by dispersing stress such that the stress does not concentrate on a portion between the preform mouth portion and the preform body at which a thickness changes, using the skin layer formed in the portion. Thus, an object of the present invention is to improve the productivity of the injection stretch blow molding machine.

Solution to Problem

The present invention has been made in consideration of the aforementioned subject. The present invention provides an injection molding mold for an injection stretch blow molding machine including an injection molding unit, a stretch blow molding unit, and an ejection unit that are disposed under a rotating plate unit having a rotating plate having lip molds each for molding an outer peripheral surface of a preform mouth portion and transferring a preform on a bottom surface of the rotating plate, around a rotation central axis of the rotating plate, the rotating plate unit stopping and ascending or descending whenever the rotating plate rotates at a constant rotation angle, with the lip molds corresponding to the injection molding unit, the stretch blow molding unit, and the ejection unit whenever the rotating plate descends, wherein in the injection molding unit, a cavity mold and a core mold that ascends and descends insertably into the cavity mold are disposed, and the lip mold, the cavity mold, and the core mold that is inserted into the cavity mold through the lip mold are provided so as to be capable of forming the injection molding mold, the injection molding mold has a preform formation space enclosed by the lip mold, the cavity mold, and the core mold, the preform formation space is formed from a preform mouth portion forming portion, a preform body forming portion that is continuous with the preform mouth portion forming portion and has a gap width uniform and wider than a gap width of the preform mouth portion forming portion, and a preform bottom forming portion that is continuous with the preform body forming portion and has a lower end located on the side of a gate, the core mold includes a preform mouth portion inner surface forming portion corresponding to the preform mouth portion forming portion, a preform body inner surface forming portion corresponding to the preform body forming portion, and a preform bottom inner surface forming portion corresponding to the preform bottom forming portion, the core mold also including a diameter enlarging portion in which the diameter of the core mold is gradually enlarged from the preform body inner surface forming portion to the preform mouth portion inner surface forming portion, in the diameter enlarging portion, a core mold outer peripheral surface is tapered so as to be inclined outward relative to a position of an upper extension line along the core mold outer peripheral surface in the preform body inner surface forming portion, and the core mold outer peripheral surface in the diameter enlarging portion is continuous between the preform body inner surface forming portion and a portion of the preform mouth portion inner surface forming portion facing the lip mold. Thus, the present invention can solve the aforementioned subject.

In the present invention, the core mold outer peripheral surface in the diameter enlarging portion is preferably inclined such that an upward extension line along the core mold outer peripheral surface of the diameter enlarging portion intersects an upper end position of the preform mouth portion forming portion.

In the present invention, the diameter enlarging portion is preferably provided so as to extend between a portion of the preform body inner surface forming portion facing the cavity mold and a portion of the preform mouth portion inner surface forming portion facing the lip mold through a height position of a parting line between the cavity mold and the lip mold.

In the present invention, a cylindrical portion the diameter of which is reduced downward is preferably provided between the preform body forming portion and the preform bottom forming portion, and the cylindrical portion is preferably tapered such that a downward tangent of the cylindrical portion in a vertical direction is inclined to a center line of the preform formation space with respect to a downward extension line of the preform body forming portion.

One invention provides a preform molding method including: injecting a resin into the injection molding mold for the injection stretch blow molding machine described above; molding a preform having a skin layer formed in a surface layer of the resin charged into the preform formation space by cooling due to contact with the injection molding mold, the skin layer having a lower temperature than a middle layer of the charged resin, and opening the mold; and transferring the preform from the injection molding unit to the stretch blow molding unit by the lip mold holding the preform in which the temperature of the skin layer is lower than that of the middle layer, wherein a stress dispersion surface portion is formed in a portion of the charged resin corresponding to the diameter enlarging portion of the core mold, and in the stress dispersion surface portion, the diameter of the skin layer having the lower temperature than the middle layer due to contact with the diameter enlarging portion is enlarged upward in a tapered manner. Thus, the present invention can solve the aforementioned subject.

In the invention described above, the stress dispersion surface portion is preferably formed continuously so as to extend between the preform body forming portion on the side of the core mold of the preform formation space and the preform mouth portion forming portion on the side of the core mold.

In the invention described above, the stress dispersion surface portion preferably prevents an ascent of the resin charged into the preform body forming portion by being associated with an ascent of the core mold due to mold opening.

Further another invention provides a preform having a bottom including a preform mouth portion, a preform body that is continuous with the preform mouth portion and thicker than the preform mouth portion, and a preform bottom that is continuous with the preform body, in which a skin layer of a surface layer has a lower temperature than a middle layer, and the preform body and the preform bottom are expandable and deformable from the inside of the preform to the outside of the preform, wherein the skin layer extending between an inner surface of the preform body and an inner surface of the preform mouth portion is tapered upward so as to be inclined outward with respect to an upward extension line of the skin layer in the inner surface of the preform body. Thus, the present invention can solve the aforementioned subject.

Still further another invention provides a container molding method by an injection stretch blow molding machine including an injection molding unit, a stretch blow molding unit, and an ejection unit that are disposed under a rotating plate unit having a rotating plate having lip molds each for molding an outer peripheral surface of a preform mouth portion and transferring a preform on a bottom surface of the rotating plate, around a rotation central axis of the rotating plate, the rotating plate unit stopping and ascending or descending whenever the rotating plate rotates a constant rotation angle, with the lip molds corresponding to the injection molding unit, the stretch blow molding unit, and the ejection unit whenever the rotating plate descends, wherein in the injection molding unit, a cavity mold and a core mold that ascends and descends insertably into the cavity mold are disposed, and the lip mold, the cavity mold, and the core mold that is inserted into the cavity mold through the lip mold are provided so as to be capable of forming the injection molding mold, the stretch blow molding unit has a blow mold, a stretch rod to be inserted into the blow mold for stretching, and blow air supply unit for feeding blow air into the blow mold, and the lip mold situated in a position corresponding to the stretch blow molding unit, the blow mold, the stretch rod inserted into the blow mold through the lip mold, and the blow air supply unit are provided so as to be capable of forming a blow molding mold, in the ejection unit, a molded product reception portion is formed under the lip mold situated in a position corresponding to the ejection unit, and when the injection stretch blow molding machine molds the container, the injection molding mold has a preform formation space enclosed by the lip mold, the cavity mold, and the core mold, the preform formation space is formed from a preform mouth portion forming portion, a preform body forming portion that is continuous with the preform mouth portion forming portion and has a gap width uniform and wider than a gap width of the preform mouth portion forming portion, and a preform bottom forming portion that is continuous with the preform body forming portion and has a lower end located on the side of a gate, the core mold includes a preform mouth portion inner surface forming portion corresponding to the preform mouth portion forming portion, a preform body inner surface forming portion corresponding to the preform body forming portion, and a preform bottom inner surface forming portion corresponding to the preform bottom forming portion, the core mold also including a diameter enlarging portion in which the diameter of the core mold is gradually enlarged from the preform body inner surface forming portion to the preform mouth portion inner surface forming portion, in the diameter enlarging portion, a core mold outer peripheral surface is tapered so as to be inclined outward relative to a position of an upper extension line along the core mold outer peripheral surface in the preform body inner surface forming portion, and the core mold outer peripheral surface in the diameter enlarging portion is continuous between the preform body inner surface forming portion and a portion of the preform mouth portion inner surface forming portion facing the lip mold, the container molding method including; injecting a resin into the injection molding mold, molding a preform having a skin layer formed in a surface layer of the resin charged into the preform formation space by cooling due to contact with the injection molding mold, the skin layer having a lower temperature than a middle layer of the charged resin, and opening the mold, and transferring the preform from the injection molding unit to the stretch blow molding unit by the lip mold holding the preform in which the temperature of the skin layer is lower than that of the middle layer;

molding the preform that has been held by the lip mold and transferred to the stretch blow molding unit, into the container using the blow molding mold;

transferring the molded container from the stretch blow molding unit to the ejection unit, with the container held by the lip mold; and releasing hold of the container by the lip mold, when the container that has been held by the lip mold and transferred to the ejection unit is situated in a position corresponding to the molded product reception portion. Thus, the present invention can solve the aforementioned subject.

In the invention described above, the core mold outer peripheral surface in the diameter enlarging portion of the core mold is preferably inclined such that an upward extension line along the core mold outer peripheral surface of the diameter enlarging portion intersects an upper end position of the preform mouth portion forming portion.

In the invention described above, the diameter enlarging portion of the core mold is preferably provided so as to extend between a portion of the preform body inner surface forming portion facing the cavity mold and a portion of the preform mouth portion inner surface forming portion facing the lip mold through a height position of a parting line between the cavity mold and the lip mold.

In the invention described above, a cylindrical portion the diameter of which is reduced downward is preferably provided between the preform body forming portion and the preform bottom forming portion of the injection molding mold, and the cylindrical portion is preferably tapered such that a downward tangent of the cylindrical portion in a vertical direction is inclined to a center line of the preform formation space with respect to a downward extension line of the preform body forming portion.

Further another invention provides a container formed by the above-described container molding method. Thus, the present invention can solve the aforementioned subject.

Advantageous Effects of Invention

According to the present invention, in the preform having a bottom including a preform mouth portion, a preform body that is continuous with the preform mouth portion and thicker than the preform mouth portion, and a preform bottom that is continuous with the preform body, the skin layer of the surface layer has a lower temperature than the middle layer. In this preform, the skin layer extending between the inner surface of the preform body and the inner surface of the preform mouth portion is tapered upward so as to be inclined outward with respect to the upward extension line of the skin layer in the inner surface of the preform body.

Therefore, when the preform is molded by the injection molding unit of the injection stretch blow molding machine, the skin layer is formed widely in a vertical direction of the preform in an inner surface of a thickness change portion between the preform mouth portion and the preform body, so as to extend between a height position of an inner surface in a preform mouth portion area and a height position of an inner surface in a preform body area. Even if the body of the preform almost ascends in a following manner due to an ascent of the core mold, the tapered and wide skin layer disperses a stress from the side of the preform body, and prevents local concentration of the stress.

Therefore, when the body of the preform almost ascends in a following manner, the skin layer, which extends between the height position of the inner surface in the preform mouth portion area and the height position of the inner surface in the preform body area, prevents the following ascent. Therefore, the present invention can accelerate ascent timing of the core mold, and thus has the superior effect in which the preform is transferred to the next stretch blow molding stage, while reducing a preform molding time.

BRIEF DESCRIPTION OF DRAWINGS

FIGS. 1A-C show an injection stretch blow molding machine that carries out the present invention, in which FIG. 1A is an explanatory view of an injection molding unit viewed from the front, FIG. 1B is an explanatory view of the injection molding unit viewed from the side, and FIG. 1C is an explanatory view showing the disposition of the injection molding unit, a stretch blow molding unit, and an ejection unit.

FIGS. 2A-B show movement of the injection molding unit according to the present invention, in which FIG. 2A is an explanatory view showing a state in which a lip mold corresponds to a cavity mold, and FIG. 2B is an explanatory view showing a state of closing the molds.

FIGS. 11A-D show a sample container, in which FIG. 11A is an explanatory view viewed from above, FIG. 11B is an explanatory view viewed from the front, FIG. 11C is an explanatory view viewed from the bottom, and FIG. 11D is an explanatory view viewed from the side.

DESCRIPTION OF EMBODIMENTS (Injection Stretch Blow Molding Machine)

Figure 1C:
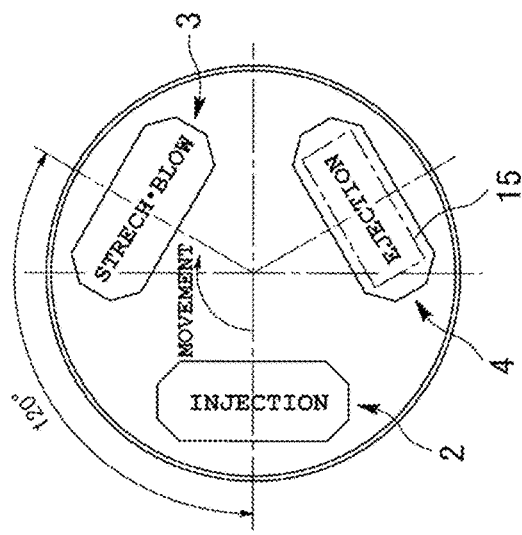
Figure 1B:
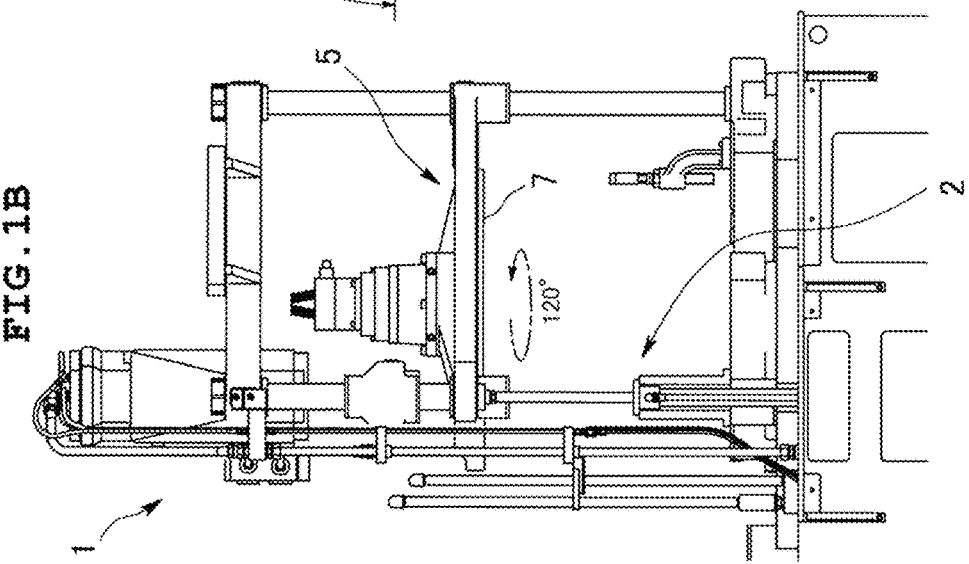
Figure 1A:
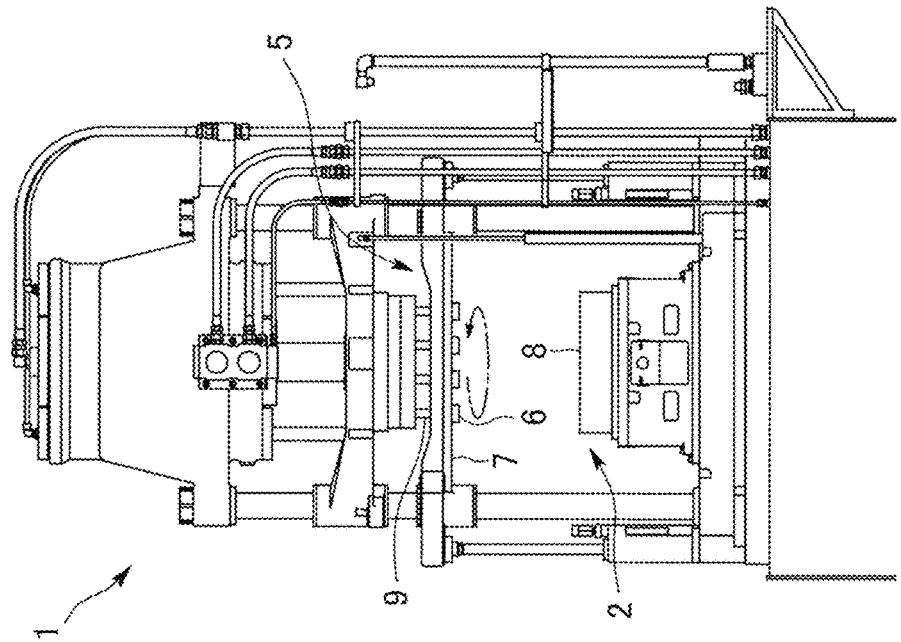

The present invention will be described in detail on the basis of embodiments illustrated in FIGS. 1A-C to FIG. 11A-B. In the drawings, the reference numeral 1 denotes an injection stretch blow molding machine. As shown in FIGS. 1A-C, the injection stretch blow molding machine 1 is provided with three stations, which includes an injection molding unit 2, a stretch blow molding unit 3, and an ejection unit 4, on a lower base plate. Further included is a rotating plate unit 5 that is movable upward and downward in a vertical direction above the three stations.

The aforementioned injection molding unit 2, stretch blow molding unit 3, and ejection unit 4 are disposed in the same circumference at intervals of a constant angle (120 degrees). In the aforementioned rotating plate unit 5, a rotating plate 7, which has lip molds 6 each for forming an outer peripheral surface of a preform mouth portion and for transferring a preform on its bottom surface, is provided rotatably about a rotation axis passing through the center of the disposition of the stations so as to stop every time the rotating plate 7 turns at a constant rotation angle (120 degrees). Whenever the rotating plate 7 stops, the lip molds 6 are situated in positions corresponding to the injection molding unit 2, the stretch blow molding unit 3, and the ejection unit 4.

When the rotating plate 7 temporarily stops and the rotating plate unit 5 descends, as described above, a cavity mold 8 fixed in the position of the aforementioned injection molding unit 2, the lip mold 6, and a core mold 9 that is movable upward and downward in the injection molding unit 2 and is inserted into the cavity mold 8 through the lip mold 6 form an injection molding mold 10 in the injection molding unit 2, as shown in FIGS. 2A-B.

Figure 3:
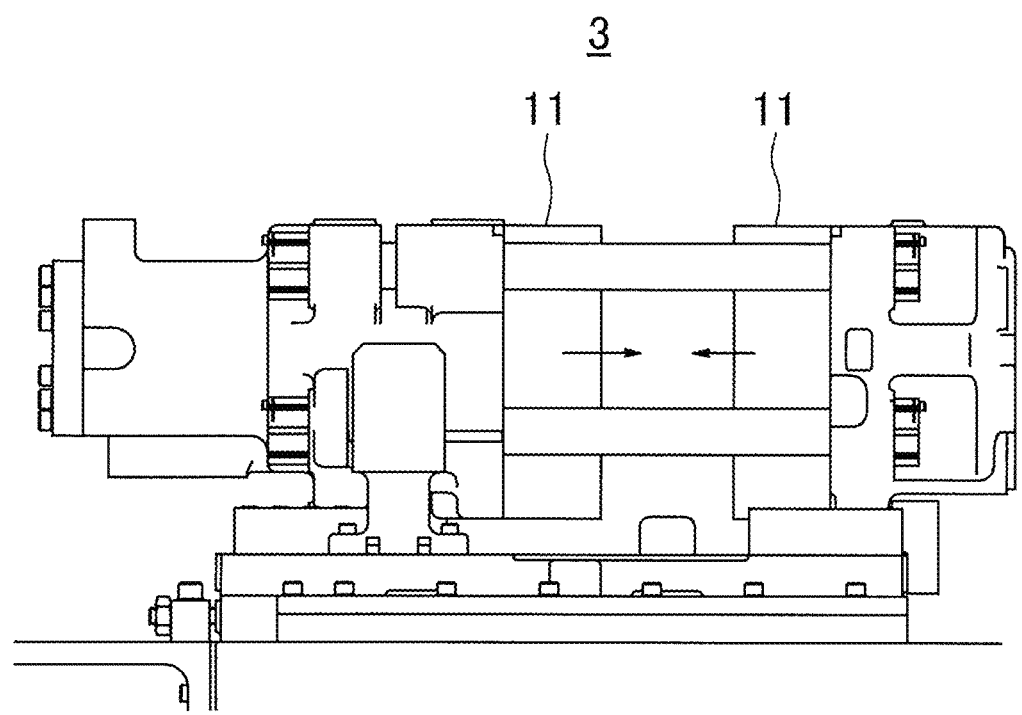
FIG. 3 is an explanatory view of a blow mold in the stretch blow molding unit according to the present invention.
Figure 4:
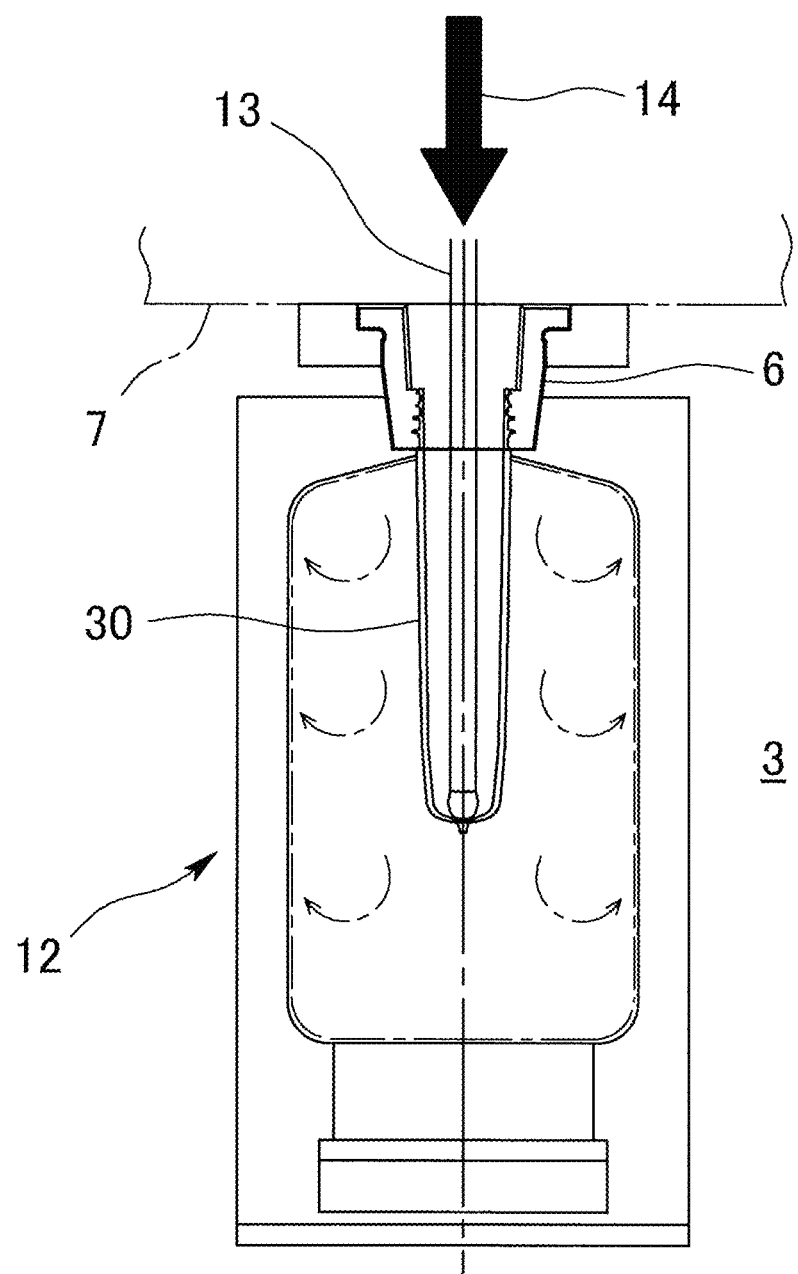
FIG. 4 is an explanatory view of stretch blowing in the stretch blow mold according to the present invention.

In the aforementioned stretch blow molding unit 3, a pair of split molds i.e. blow molds 11 disposed in the stretch blow molding unit 3, as shown in FIG. 3, and the lip mold 6 form a stretch blow mold 12. As shown in FIG. 4, stretch blow molding is performed in the stretch blow molding unit 3, by stretching operation using a stretch rod 13 inserted into the blow mold 11 and blow air blow-in 14 from blow air supply unit.

In the aforementioned ejection unit 4, a molded product reception port 15 is formed under the lip mold 6 that is situated in the position corresponding to the ejection unit 4. When the lip mold 6 releases the hold of a molded product, the molded product is sent out of the machine.

In the injection stretch blow molding machine 1 including the injection molding unit 2, the stretch blow molding unit 3, the ejection unit 4, and the rotating plate unit 5, as described above, a resin is fed from an injection device into the injection molding mold 10 formed by the lip mold 6 disposed in the injection molding unit 2, to mold a preform. The molded preform is transferred to the stretch blow molding unit 3 by an ascent movement and a circular movement of the lip mold 6 due to an ascent of the rotating plate unit 5 and a turn of the rotating plate 7 after opening the mold. In the stretch blow molding unit 3, the preform is molded into a container by stretch blowing. Furthermore, the transfer of the lip mold 6 causes the molded container to be transferred from the stretch blow molding unit 3 to the ejection unit 4. In the ejection unit 4, since the lip mold 6 releases the hold of the container, the container, i.e., the molded product is sent out of the machine.

(Preform Formation Space)

Figure 5:
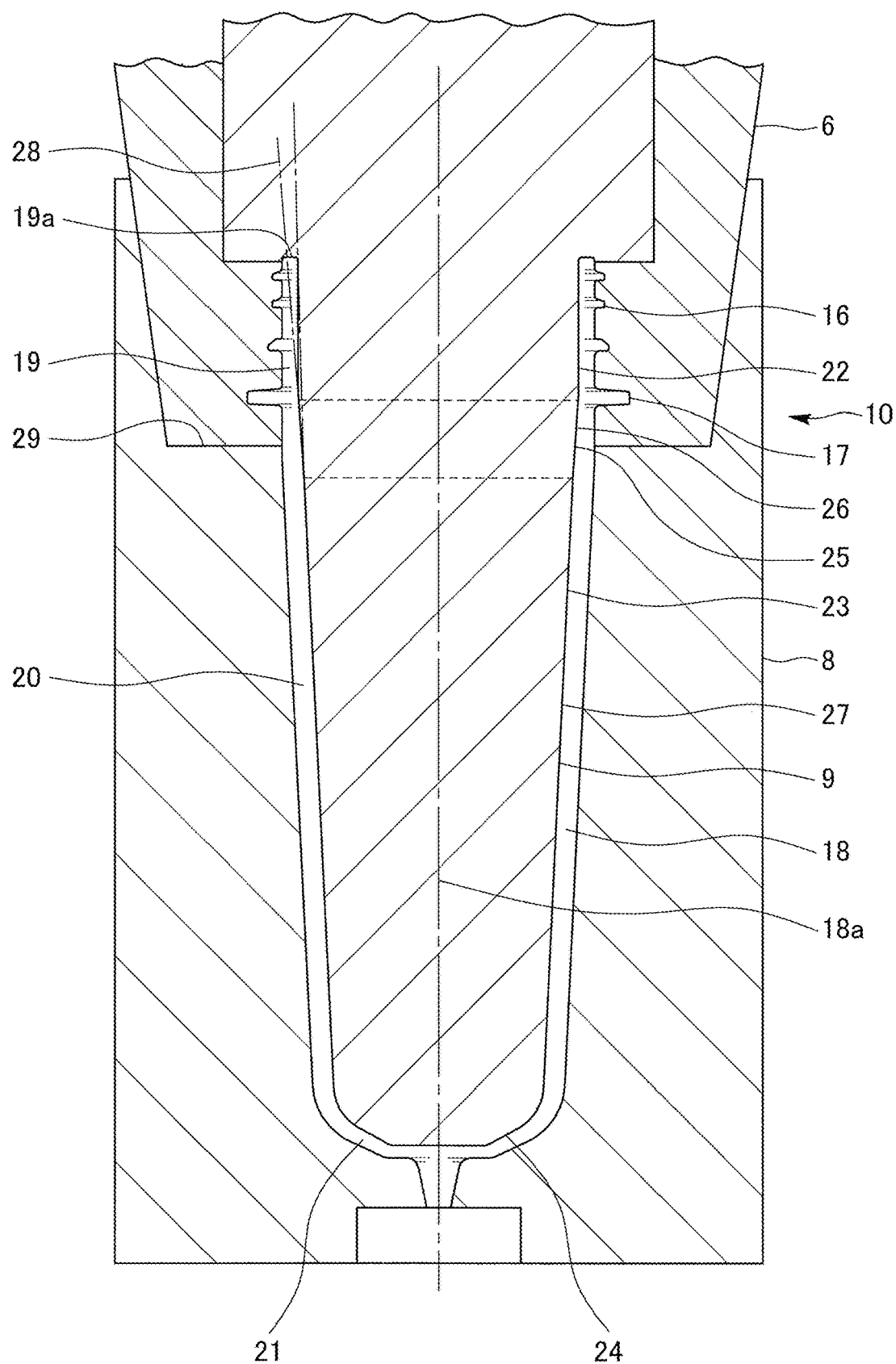
FIG. 5 is an explanatory view schematically showing an injection molding mold according to the present invention.

FIG. 5 shows the injection molding mold 10 of the aforementioned injection molding unit 2, which is constituted of the lip mold 6, the cavity mold 8, and the core mold 9, as described above. The injection molding mold 10 is a mold for use in molding a preform for a container of the type of a PET bottle, the container body of which is large in diameter relative to the container mouth portion thereof in its final molded shape. Thus, the lip mold 6 includes a screw formation recessed portion 16 and a flange formation recessed portion 17.

As shown in FIG. 5, the lip mold 6, the cavity mold 8, and the core mold 9 of the injection molding mold 10 form a preform formation space 18 in an enclosed manner. The preform formation space 18 is formed from a preform mouth portion forming portion 19, a preform body forming portion 20 that is continuous with the preform mouth portion forming portion 19 and has a gap width that is uniform and wider than the gap width of the preform mouth portion forming portion 19, and a preform bottom forming portion 21 that is continuous with the preform body forming portion 20 and the bottom end of which functions as a gate for feeding a molten resin from the injection device into the preform formation space 18.

(Core Mold)

The aforementioned core mold 9 is devised to prevent a collapse in the preform that has been molded in the aforementioned preform formation space 18, when opening the mold (removal of the molds). The core mold 9 is formed from a preform mouth portion inner surface forming portion 22, a preform body inner surface forming portion 23, and a preform bottom inner surface forming portion 24.

The aforementioned preform mouth portion inner surface forming portion 22 is a portion corresponding to the aforementioned preform mouth portion forming portion 19. The preform body inner surface forming portion 23 is a portion corresponding to the aforementioned preform body forming portion 20. The preform bottom inner surface forming portion 24 is a portion corresponding to the aforementioned preform bottom forming portion 21.

The core mold 9 includes a diameter enlarging portion 25 the diameter of which is gradually increased such that the degree of diameter enlargement is slightly larger than the degree of diameter enlargement of the preform body inner surface forming portion 23 (the degree of gradually increasing the diameter of the core mold upward of the core mold). As shown in the drawing, the diameter enlarging portion 25 is provided between the preform body inner surface forming portion 23 and the preform mouth portion inner surface forming portion 22.

(Diameter Enlarging Portion)

In the diameter enlarging portion 25, as described above, the degree of diameter enlargement is slightly larger than the degree of diameter enlargement of the preform body inner surface forming portion 23 upward of the core mold. Thus, a core mold outer peripheral surface 26 of the diameter enlarging portion 25 is tapered so as to be inclined outward relative to the position of an upward extension line 28 along a core mold outer peripheral surface 27 of the preform body inner surface forming portion 23.

Furthermore, the aforementioned core mold outer peripheral surface 26 is provided between the preform body inner surface forming portion 23 and the preform mouth portion inner surface forming portion 22, in particular, is continuous with a portion of the preform mouth portion inner surface forming portion 22 facing the lip mold 6. The upward extension line 28 along the core mold outer peripheral surface 26 is formed so as to intersect an upper end position 19*a* of the aforementioned preform mouth portion forming portion 19 of the preform formation space 18.

In order to continue the core mold outer peripheral surface 26 of the aforementioned diameter enlarging portion 25 of the core mold 9 from a portion between the preform body inner surface forming portion 23 and the preform mouth portion inner surface forming portion 22 facing the lip mold 6, as described above, the diameter enlarging portion 25 is situated as follows in this embodiment.

Specifically, the diameter enlarging portion 25 is provided between a portion of the preform body inner surface forming portion 23 facing the cavity mold 8 and a portion of the preform mouth portion inner surface forming portion 22 facing the lip mold 6 through a height position 29 of a parting line between the cavity mold 8 and the lip mold 6. By disposing the diameter enlarging portion 25 in this manner, the tapered core mold outer peripheral surface 26 of the diameter enlarging portion 25 is formed so as to be enlarged in a vertical direction of the core mold.

(Formation of Preform)

In the aforementioned injection stretch blow molding machine 1, since the resin is injected from the injection device into the aforementioned injection molding mold 10 structured in the injection molding unit 2 and is fed into the aforementioned preform formation space 18 of the injection molding mold 10, a preform is molded in which a surface layer that is in contact with the surrounding injection molding mold is cooled to have a low temperature and hardened into a skin layer, even though a middle layer of the charged resin has a high temperature. The preform is molded in the order of several seconds. Upon opening the mold, the preform is transferred to the next stretch blow molding unit 3 with the lip mold 6, to obtain the preform to be subject to stretch blowing.

(Preform)

Figure 6:
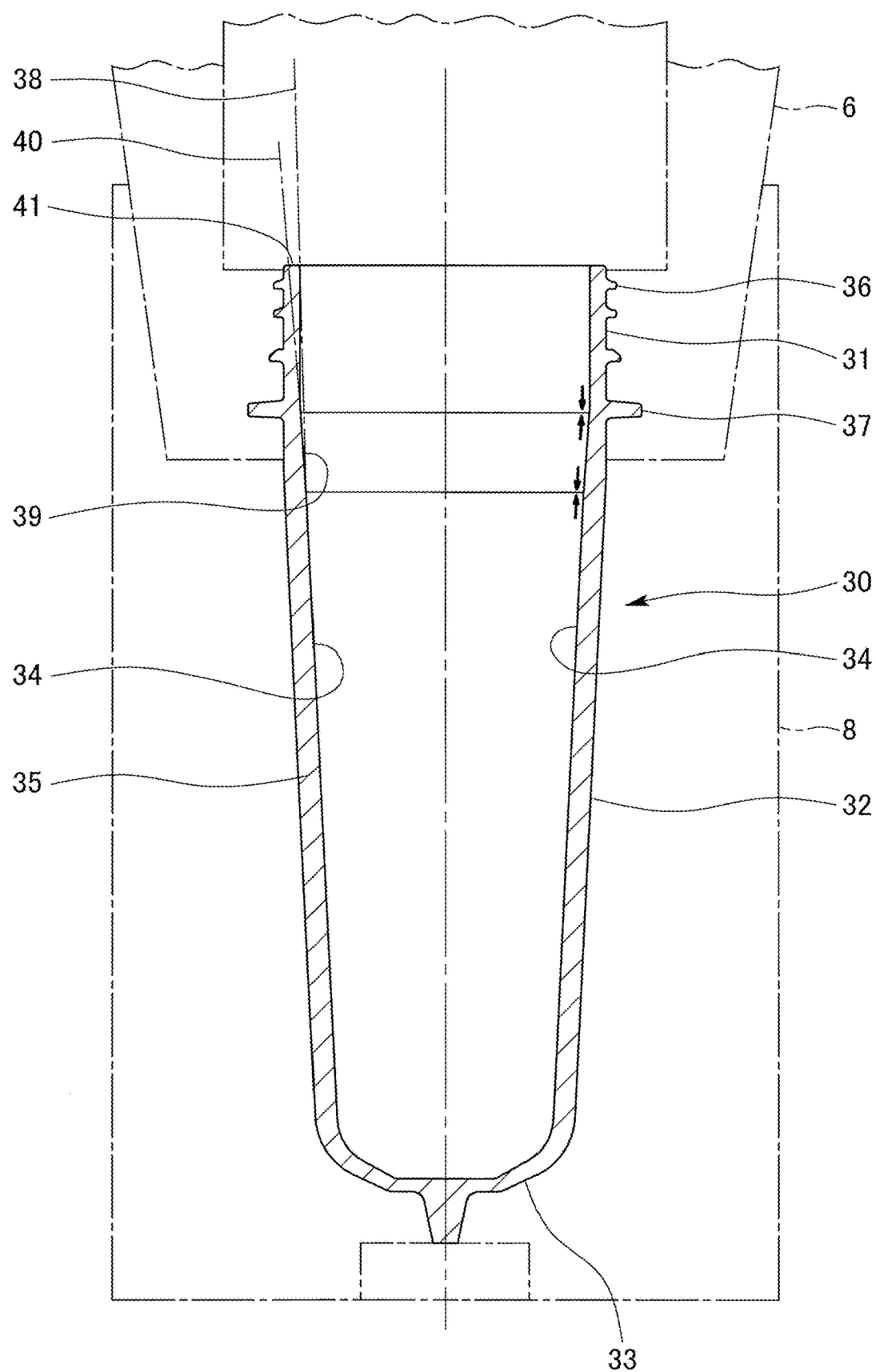
FIG. 6 is an explanatory view showing an example of a preform molded in the injection molding unit according to the present invention.

FIG. 6 shows a preform 30 molded with the aforementioned injection molding mold 10. The preform 30 having a bottom includes a preform mouth portion 31, a preform body 32 continuous with the preform mouth portion 31, and a preform bottom 33 continuous with the preform body 32. A skin layer 34 of a surface layer has a lower temperature than a middle layer 35. The preform body 32 and the preform bottom 33 can be expanded and deformed from the inside of the preform to the outside of the preform, to obtain the shape of a PET bottle as a final shape by stretch blowing in the stretch blow molding unit 3.

Note that, a screw portion 36 and a flange portion 37 are integrally formed in the outer peripheral surface of the preform mouth portion 31 in accordance with the screw formation recessed portion 16 and the flange formation recessed portion 17 in the aforementioned lip mold 6, respectively.

The skin layer 34 inside the aforementioned preform 30 has a portion corresponding to the diameter enlarging portion 25 of the aforementioned core mold 9. In other words, the skin layer 34 extending from an inner surface of the preform body 32 to an inner surface of the preform mouth portion 31 is a portion formed continuously from the preform body forming portion 20 on the side of the core mold 9 to the preform mouth portion forming portion 19 on the side of the core mold 9 in the aforementioned preform formation space 18 when molding a preform, and therefore, this portion is molded while being in contact with the core mold outer peripheral surface 26 of the diameter enlarging portion 25 of the core mold 9.

(Stress Dispersion Surface Portion)

The skin layer 34 that is molded while being in contact with the core mold outer peripheral surface 26 of the diameter enlarging portion 25 has a tapered shape opened upward so as to be inclined outward relative to an upward extension line 38 of the skin layer 34 in the inner surface of the preform body 32. The skin layer 34 that is molded while being in contact with the core mold outer peripheral surface 26 of the diameter enlarging portion 25 serves as a stress dispersion surface portion 39.

The aforementioned stress dispersion surface portion 39 made of the skin layer 34 has the function of preventing a collapse in the shape of the preform when opening the mold. The stress dispersion surface portion 39 is a portion to prevent upward movement of the resin charged in the aforementioned preform body forming portion in association with an ascent of the core mold 9 due to the mold opening.

In the preform formation space 18 of the injection molding mold 10, the preform 30 is molded in a state that the skin layer 34 having a lower temperature than the middle layer 35 has a higher stiffness than the flowable resin of the middle layer 35. The aforementioned stress dispersion surface portion 39 is a portion having a high stiffness in the inner surface of the preform 30. In the same manner, the skin layer 34 also has a high stiffness inside the preform mouth portion 31 and the preform body 32, which are continuous with the stress dispersion surface portion 39.

In the injection stretch blow molding machine 1, the core mold 9 is caused to ascend by mold opening, when the above-described preform 30 is obtained. When the preform body inner surface forming portion 23 of the core mold 9 ascends, the preform body 32 of the preform 30 almost ascends in a following manner, and an ascending pressure is transferred from the preform body 32 to the aforementioned stress dispersion surface portion 39.

As described above, the core mold outer peripheral surface 26 of the diameter enlarging portion 25 is formed widely in the vertical direction of the core mold, and the extension line 28 of the core mold outer peripheral surface 26 intersects the upper end position 19a of the preform mouth portion forming portion 19. Thus, the aforementioned stress dispersion surface portion 39 is formed widely in the vertical direction of the preform 30, and the stress dispersion surface portion 39 is inclined such that an upward extension line 40 along the stress dispersion surface portion 39 intersects an upper end surface 41 of the preform mouth portion 31.

When the aforementioned ascending pressure is transferred from the preform body 32 to the stress dispersion surface portion 39, a stress occurs in the stress dispersion surface portion 39 as a drag, but the stress is dispersed in the wide stress dispersion surface portion 39 without being concentrated locally. Furthermore, since the stress dispersion surface portion 39 is inclined extremely shallowly relative to a following ascending direction of the preform body (ascending direction of the core mold), the stress is properly transferred to the skin layer 34 in the inner surface of the preform mouth portion 31. Since the preform mouth portion 31 itself is thin, the ratio of the skin layer 34 to the thickness of the preform mouth portion 31 is high (the thickness of the skin layer is thick in a thickness direction of the preform mouth portion). As a result, the entire preform mouth portion 31 has an increased stiffness, and certainly supports the pressure from the stress dispersion surface portion 39. Note that, in FIG. 6, arrows indicate the directions of the pressure in the skin layer 34.

Therefore, when the core mold 9 is caused to ascend, a following ascent of the preform body 32 is certainly prevented without collapsing the stress dispersion surface portion 39, and the mold is opened in an appropriate manner without collapsing the shape of the preform 30, thus having the effect of accelerating ascent timing of the core mold.

To mold a container, after the injection stretch blow molding machine 1 molds the preform 30, as described above, the injection stretch blow molding machine 1 performs stretch blow molding at the stretch blow molding unit 3, and sends a PET bottle type container obtained by the stretch blow molding out of the machine at the ejection unit 4.

(Comparison)

Figure 7:
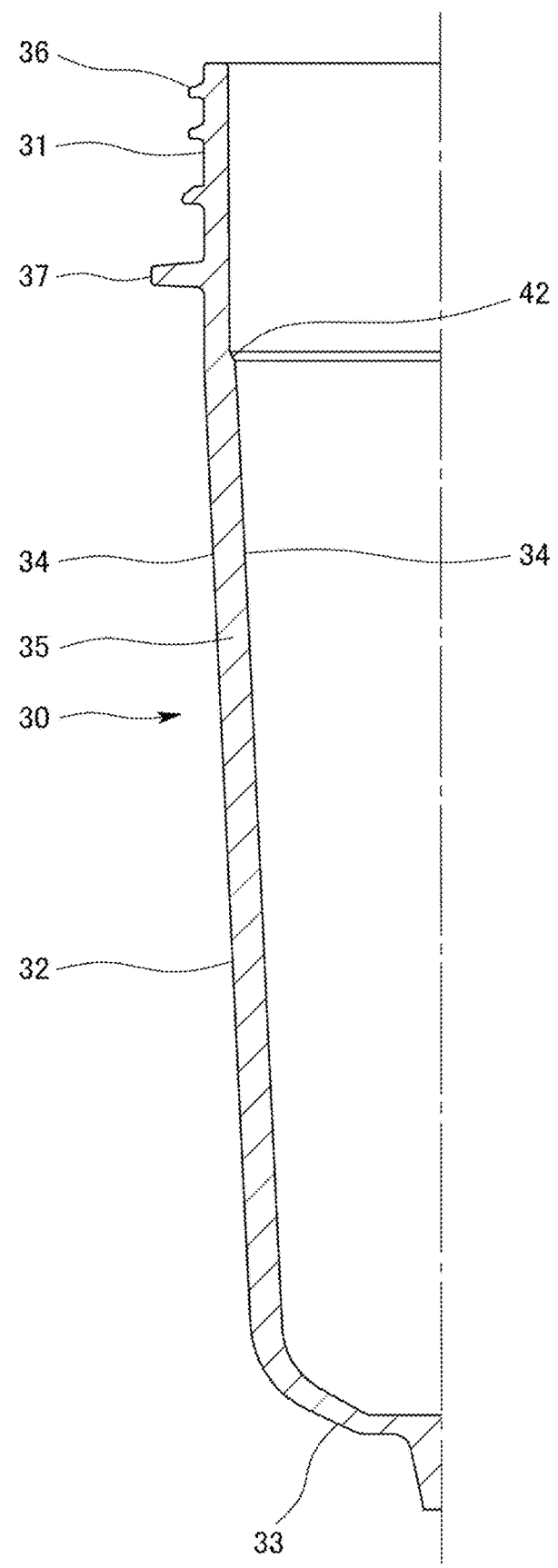
FIG. 7 is an explanatory view showing the shape of a conventional preform, for the sake of comparison.

FIG. 7 shows a conventional preform 30 for the sake of comparison. Note that the same reference numerals indicate the same components for ease of explanation. The conventional preform 30 molded in an injection molding unit of an injection stretch blow molding machine had a step portion 42 in an inner surface of a preform body 32 on the side of a preform mouth portion 31, in order to absorb the difference in thickness between the preform mouth portion 31 and the preform body 32.

The entire step portion 42 was formed in an area corresponding to a cavity mold 8, and an inner peripheral surface of the step portion 42 was inclined such that an upward extension line along the inner peripheral surface intersected a base end of the preform mouth portion 31.

To mold a preform having the conventional shape, when a core mold was caused to ascend with timing for obtaining a preform of the present invention, it was confirmed that a following ascending pressure of the preform body collapsed a skin layer in the step portion 42, and the collapse even caused a collapse of the preform body.

When comparing between the time for molding the conventional preform as a comparison from a feed of the resin (injection) to an ascent of the core mold (mold opening) and the time for molding the preform of the present invention from a feed of the resin (injection) to an ascent of the core mold (mold opening), it was confirmed that the time was reduced by the order of 20%.

(Example of Contrivance for Feeding Resin)

Figure 8:
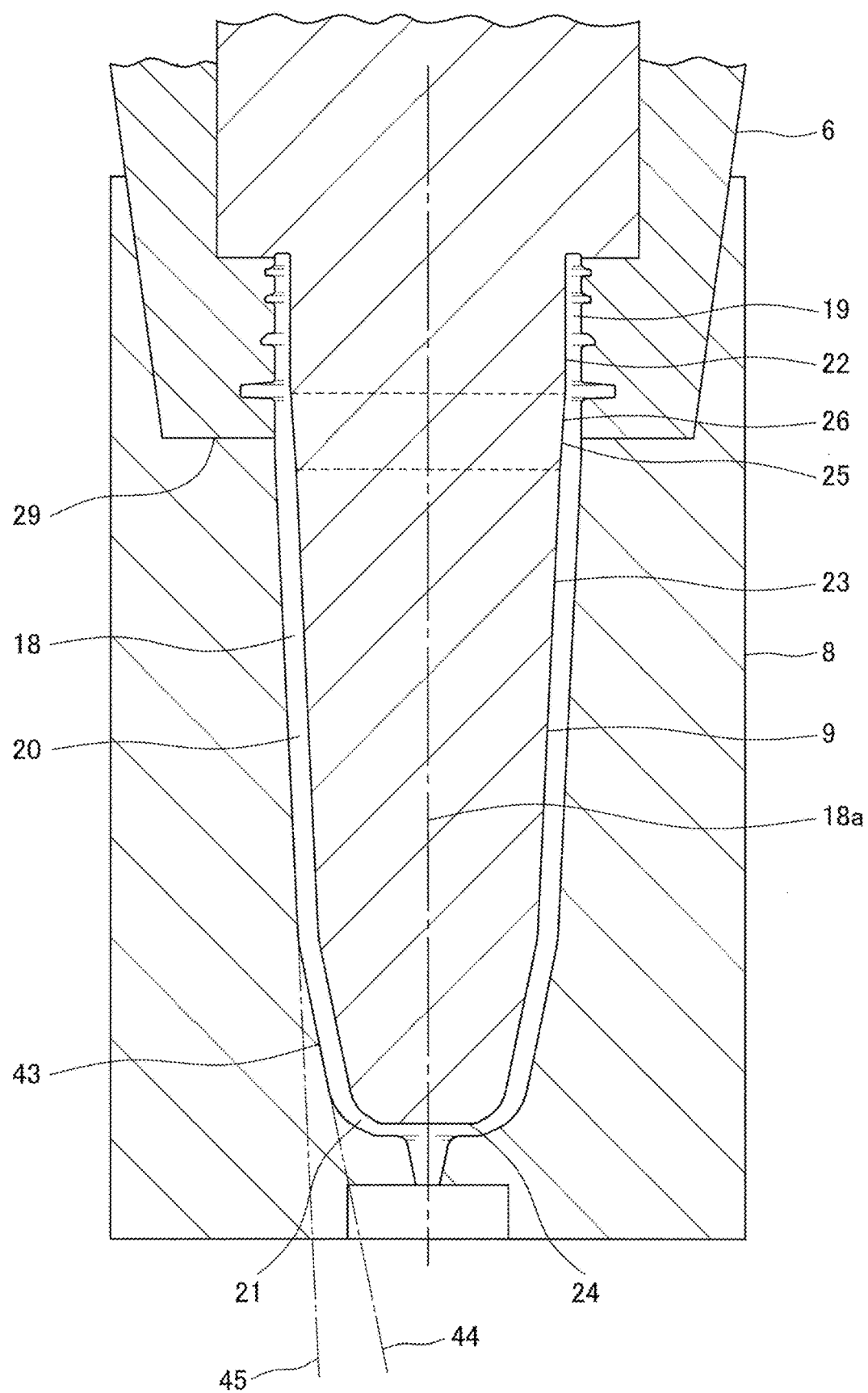
FIG. 8 is an explanatory view of a modified example of an injection molding mold according to the present invention.

FIG. 8 shows an example of the contrivance for the shape of the preform formation space, when molding a preform of the present invention, for ease in charging the resin into the preform formation space of the injection molding mold.

In this modified example, in the preform formation space 18, a cylindrical portion 43 the diameter of which is reduced downward is provided between the aforementioned preform body forming portion 20 and the aforementioned preform bottom forming portion 21. The cylindrical portion 43 is tapered such that a downward tangent 44 of the cylindrical portion 43 in the vertical direction is inclined to a center line 18a of the preform formation space, with respect to a downward extension line 45 of the preform body forming portion 20.

According to this structure, when the resin is fed from the gate, the resin moves with a reduced resistance from the preform bottom forming portion 21 to the preform body forming portion 20, thus facilitating charging the resin in a smoother manner. This provides a favorable effect in acceleration of the ascent timing of the core mold.

(Example for Molding Jar)

Figure 9:
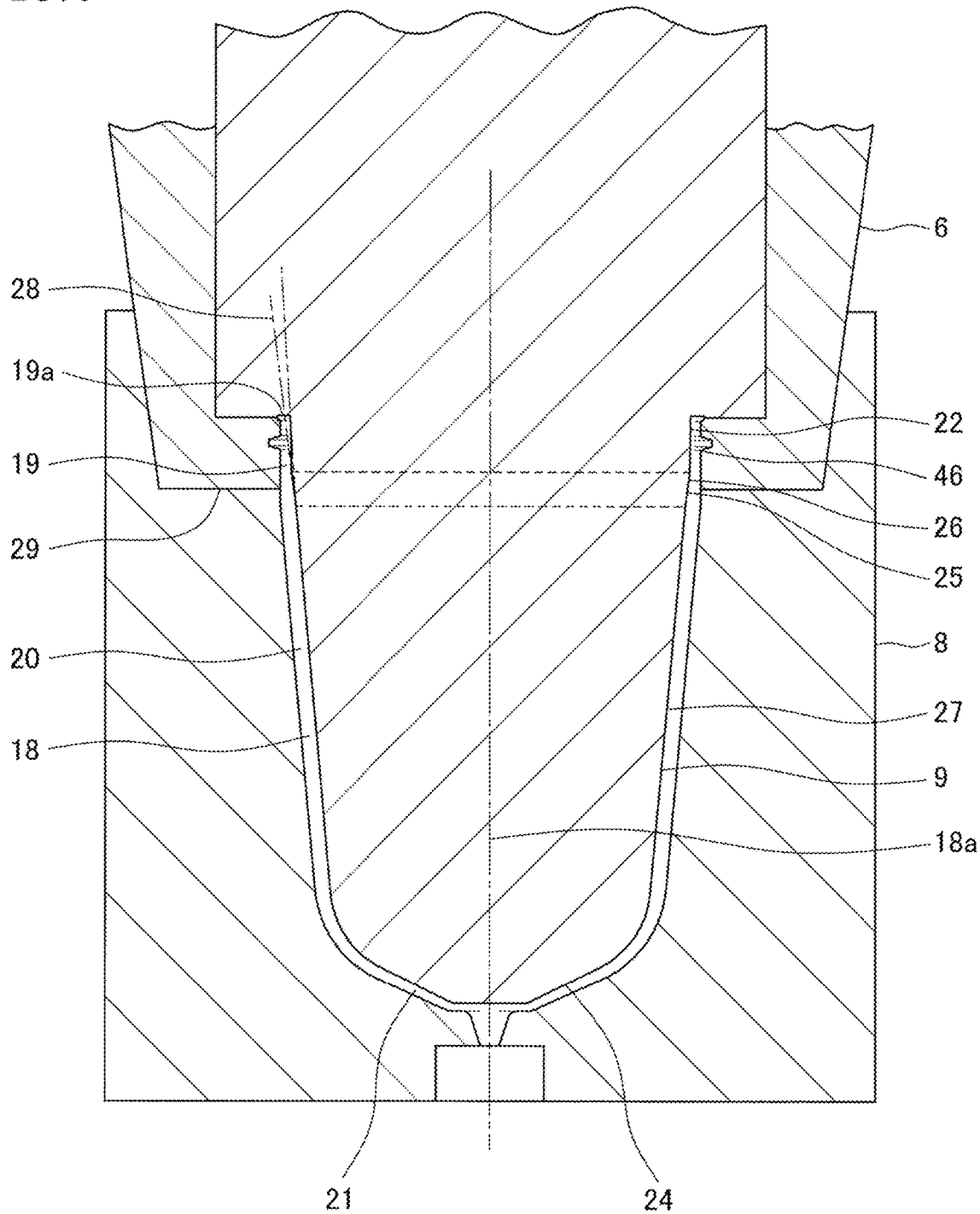
FIG. 9 is an explanatory view schematically showing an injection molding mold according to another embodiment of the present invention.

The above-described embodiment describes molding of the preform to obtain the PET bottle type molded product the body of which has a large diameter relative to the diameter of the mouth portion, as a final molded product, but the present invention is not limited to the above-described embodiment. FIG. 9 shows an example of molding a preform to obtain a jar as a final molded product. The jar itself as the final molded product is a jar the mouth portion of which is covered with a lid. A fit projection molding recessed portion 46 is provided in an outer peripheral surface of the preform mouth portion forming portion. Note that the same reference numerals as in the above-described embodiment indicate the same types of components, and a description thereof will be omitted.

In this embodiment, just as with the above-described embodiment, the aforementioned injection stretch blow molding machine 1 performs the stages of preform molding and stretch blow molding, and then a final molded product is sent out of the machine to obtain a jar. Out of a lip mold 6, a cavity mold 8, and a core mold 9 that constitute a preform mouth portion forming space 18, the core mold 9 is provided with a diameter enlarging portion 25.

(Diameter Enlarging Portion)

In the diameter enlarging portion 25, the degree of enlargement of the diameter of the core mold is slightly larger than the degree of diameter enlargement of a preform body inner surface forming portion 23 in an upward direction of the core mold. A core mold outer peripheral surface 26 of the diameter enlarging portion 25 is tapered so as to be inclined outward relative to the position of an upward extension line 28 along a core mold outer peripheral surface 27 of the preform body inner surface forming portion 23.

The above-described core mold outer peripheral surface 26 is continuous with an area facing the lip mold 6 between the preform body inner surface forming portion 23 and a preform mouth portion inner surface forming portion 22. An upward extension line 28 along the core mold outer peripheral surface 26 intersects an upper end position 19a of a preform mouth portion forming portion 19.

In order to continue the core mold outer peripheral surface 26 of the aforementioned diameter enlarging portion 25 from a portion facing the lip mold 6 between the preform body inner surface forming portion 23 and the preform mouth portion inner surface forming portion 22, also in this embodiment, the diameter enlarging portion 25 is provided so as to extend between a portion of the preform body inner surface forming portion 23 facing the cavity mold 8 and a portion of the preform mouth portion inner surface forming portion 22 facing the lip mold 6 through the height position 29 of the parting line between the cavity mold 8 and the lip mold 6. This disposition makes the tapered core mold outer peripheral surface 26 of the diameter enlarging portion 25 formed widely in the vertical direction of the core mold.

(Preform)

Figure 10:
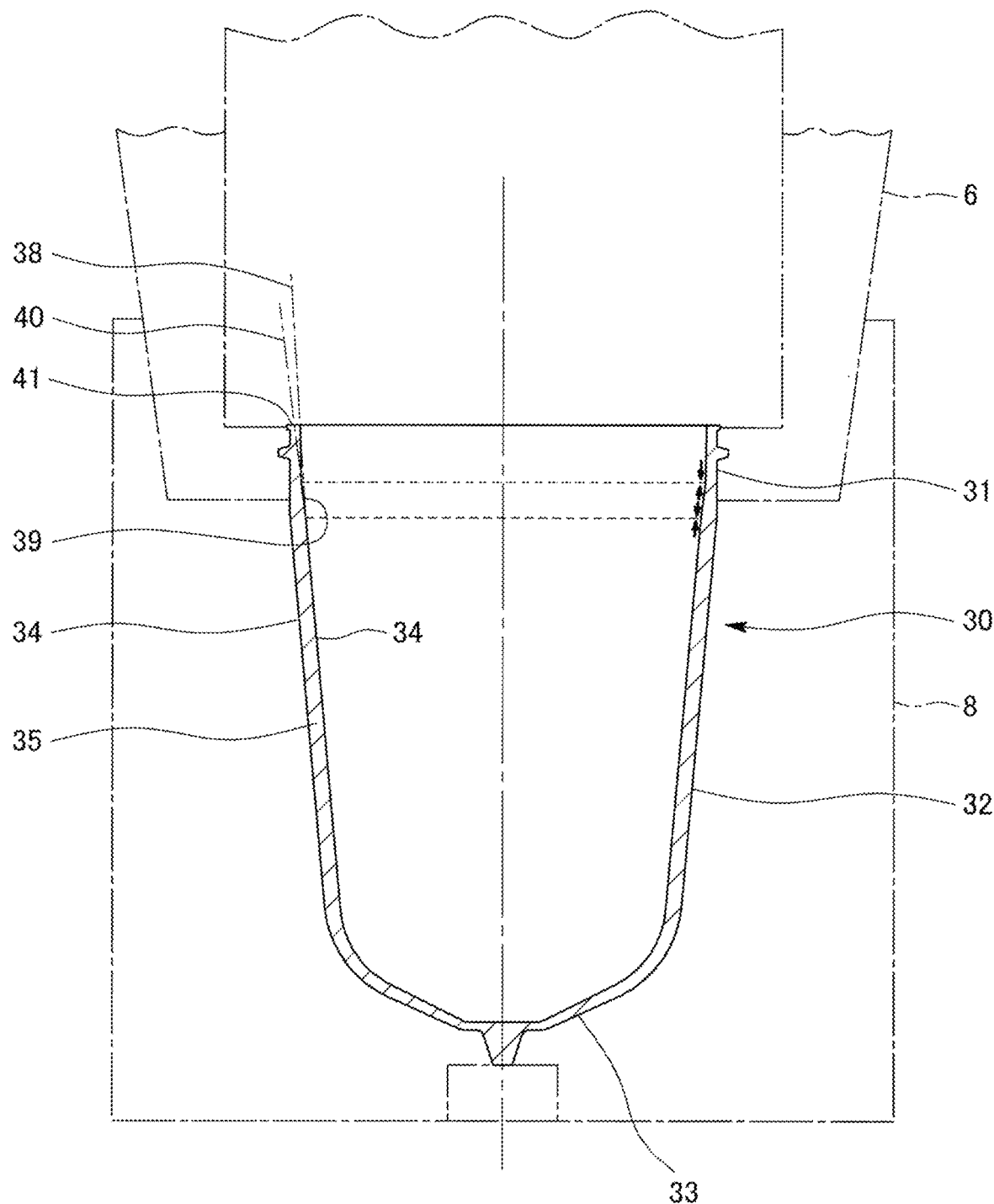
FIG. 10 is an explanatory view showing the shape of a preform according to the other embodiment of the present invention.
Figure 11A:
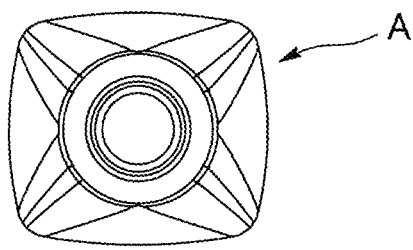
Figure 11B:
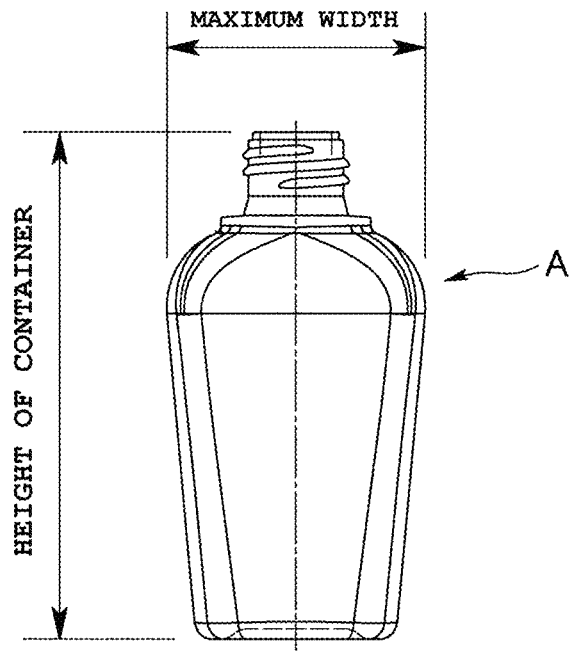
Figure 11D:
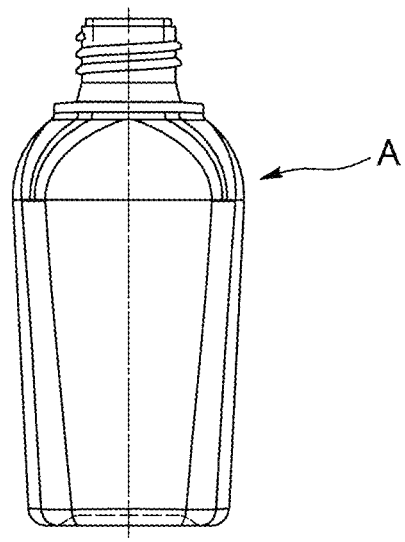
Figure 11C:
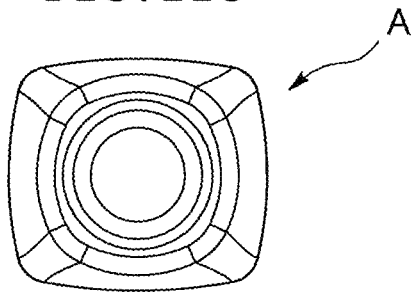

FIG. 10 shows a preform 30 molded with an injection molding mold 10 according to the above-described other embodiment. In the preform 30, a skin layer 34 of a surface layer has a lower temperature than a middle layer 35. A preform body 32 and a preform bottom 33 can be expanded and deformed from the inside of the preform to the outside of the preform, to obtain the shape of a jar as a final shape by stretch blowing in the stretch blow molding unit 3.

The skin layer 34 extending from an inner surface of the preform body 32 to an inner surface of a preform mouth portion 31 is a portion formed continuously from the preform body forming portion 20 on the side of the core mold 9 to the preform mouth portion forming portion 19 on the side of the core mold 9 in the preform formation space 18 when molding a preform, and therefore, this portion is molded while being in contact with the core mold outer peripheral surface 26 of the diameter enlarging portion 25 of the core mold 9.

(Stress Dispersion Surface Portion)

The skin layer 34 that is molded while being in contact with the core mold outer peripheral surface 26 of the diameter enlarging portion 25 has a tapered shape opened upward so as to be inclined outward relative to an upward extension line 38 of the skin layer 34 in the inner surface of the preform body 32. Just as with the above-described embodiment, the skin layer 34 that is molded with the core mold outer peripheral surface 26 serves as a stress dispersion surface portion 39.

In the preform 30 molded in the preform formation space 18, the aforementioned stress dispersion surface portion 39 in the inner surface of the preform 30 has an increased stiffness, and the skin layer 34 inside the preform mouth portion 31 and the skin layer 34 inside the preform body 32 also have an increased stiffness.

When the preform body inner surface forming portion 23 of the core mold 9 ascends by mold opening, the preform body 32 of the preform 30 almost ascends in a following manner, and an ascending pressure is transferred from the preform body 32 to the stress dispersion surface portion 39.

The core mold outer peripheral surface 26 of the diameter enlarging portion 25 is formed widely in the vertical direction of the core mold, and the extension line 28 of the core mold outer peripheral surface 26 intersects the upper end position 19a of the preform mouth portion forming portion 19. Thus, the stress dispersion surface portion 39 is formed widely in the vertical direction of the preform 30, and the stress dispersion surface portion 39 is inclined such that an upward extension line 40 along the stress dispersion surface portion 39 intersects an upper end surface 41 of the preform mouth portion 31.

When the ascending pressure is transferred from the preform body 32 to the stress dispersion surface portion 39, a stress occurs in the stress dispersion surface portion 39 as a drag, but the stress is dispersed in the wide stress dispersion surface portion 39 without being concentrated locally. Furthermore, since the stress dispersion surface portion 39 is inclined extremely shallowly relative to a following ascending direction of the preform body, the stress is properly transferred to the skin layer 34 in the inner surface of the preform mouth portion 31. Since the preform mouth portion 31 itself is thin, the ratio of the skin layer 34 to the thickness of the preform mouth portion 31 is high (the thickness of the skin layer is thick in a thickness direction of the preform mouth portion). Just as with the above-described embodiment, the pressure from the stress dispersion surface portion 39 is certainly supported. In FIG. 10, arrows indicate the directions of the pressure in the skin layer 34.

Also in this embodiment, when the core mold 9 is caused to ascend, a following ascent of the preform body 32 is certainly prevented without collapsing the stress dispersion surface portion 39, and the shape of the preform 30 is prevented from collapsing, thus allowing acceleration of ascent timing of the core mold.

(Molded Piece)

It is conceivable that accelerating the ascent timing of the core mold due to each of the above-described embodiments allows molding a container at a high cycle (reduced molding cycle) in the injection stretch blow molding machine having the structure according to the embodiments. Since the injection stretch blow molding machine having the above structure can accelerate the ascent timing of the core mold and reduce an injection cooling time (mold removal at high temperature) than in a conventional method, molded products were molded with the reduced injection cooling time, and the transparency of the molded products was measured in tests. As results of the tests, as described below, it was found that the injection stretch blow molding machine having the above structure could mold the molded products (thick PET containers) having increase transparency with the short injection cooling time.

In a conventional injection stretch blow molding machine, it is known that when an injection cooling time is long in an injection molding unit (corresponding to the above-described injection molding unit according to the embodiments), or when a stretch start time that is the time elapsed before starting stretching in a stretch blow molding unit (corresponding to the above-described stretch blow molding unit according to the embodiments) is long, the transparency of molded products is reduced. The longer the injection cooling time, or the longer the stretch start time, the more number of crystallized portions a preform has.

In blow molding of a preform with a delayed stretch start time (the time elapsed from setting a preform in a blow molding mold to starting blowing is long), since the preform is kept waiting for long time at a high temperature, crystallization is promoted in the preform in the stretch blow molding unit, whereby the preform is discolored white in the stretch blow molding unit. By blow molding the resulting preform, a white cloudy molded product is formed.

On the other hand, by reducing the injection cooling time as long as a preform can be removed from the mold, the preform is molded in a molten state having very little crystallization in the injection molding unit of the injection stretch blow molding machine having the aforementioned structure according to the embodiments. By immediately subjecting the preform to blow molding in the stretch blow molding unit of the injection stretch blow molding machine having the above-described structure according to the embodiments, a shaped portion of the preform that is provided to mold a container is thinned and stretched, thus allowing formation of a molded product having an extremely small number of crystallized portions owing to rapid cooling.

(Measurement of Transparency of Molded Product)

As a molded product used for measurement, a preform having a thickness of 7.5 mm was formed of a polyethylene terephthalate resin, and thus a container A having the shape of FIGS. 11A-D was molded. In the shape of the container A, a container body is elliptical in plan having a maximum width of a wide portion of 50 mm. A container height is 95 mm. The thickness of a shaped portion of the container body and the like is 1.6 to 2.1 mm. The transparency of the body of the obtained container was measured.

Five molded products (containers A) to be used for measurement were molded by the injection stretch blow molding machine having the above-described structure according to the embodiments on each of ten molding conditions in which an injection time and a cooling time of the injection molding unit and a stretch start time of the blow molding unit were changed, as samples for transparency measurement (n=5).

As abroad classification of the molding conditions in molding using the injection stretch blow molding machine having the above-described structure according to the embodiments, as shown in Table 2, a total time of the injection time and the cooling time is classified into four types i.e. 11.5 seconds, 21.0 seconds, 31.0 seconds, and 41.0 seconds. As is apparent from Table 2, it was recognized in advance that molded products under the molding conditions (3) and (4) had poor shapes. Therefore, under the molding condition (2), the stretch start time was delayed in six steps, as shown in Table 3. As described above, the five molded products (sample containers) were molded in each of the ten molding conditions. Note that each of Tables 2 and 3 also represents the shape condition and transparency of the molded products in each molding condition.

TABLE 1

| | (MOLDING CONDITIONS) TEN CONDITIONS | | | | | |
|---|---|---|---|---|---|---|
| | NOTATION OF MOLDING CONDITION | INJECTION TIME (SECONDS) | COOLING TIME (SECONDS) | TOTAL INJECTION COOLING TIME (SECONDS) | STRETCH START TIME (SECONDS) | CYCLE (SECONDS) |
| 1 | (1) | 6.5 | 5.0 | 11.5 | 0 | 14.7 |
| 2 | (2) | 11.5 | 9.5 | 21.0 | 0 | 24.2 |
| 3 | (3) | 17.0 | 14.0 | 31.0 | 2.0 | 34.2 |
| 4 | (4) | 22.5 | 18.5 | 41.0 | 2.0 | 44.2 |
| 5 | (2)-2 | 11.5 | 9.5 | 21.0 | 2.0 | 24.2 |
| 6 | (2)-4 | 11.5 | 9.5 | 21.0 | 4.0 | 24.2 |

TABLE 1-continued (MOLDING CONDITIONS) TEN CONDITIONS

| NOTATION OF MOLDING CONDITION | INJECTION TIME (SECONDS) | COOLING TIME (SECONDS) | TOTAL INJECTION COOLING TIME (SECONDS) | STRETCH START TIME (SECONDS) | CYCLE (SECONDS) |
|---|---|---|---|---|---|
| 7 (2)-6 | 11.5 | 9.5 | 21.0 | 6.0 | 24.2 |
| 8 (2)-10 | 11.5 | 9.5 | 21.0 | 10.0 | 24.2 |
| 9 (2)-15 | 11.5 | 9.5 | 21.0 | 15.0 | 24.2 |
| 10 (2)-20 | 11.5 | 9.5 | 21.0 | 20.0 | 24.2 |

TABLE 2

(DIFFERENCE IN INJECTION COOLING TIME) FOUR CONDITIONS

| | MOLDING CONDITION (1) | MOLDING CONDITION (2) | MOLDING CONDITION (3) | MOLDING CONDITION (4) |
|---|---|---|---|---|
| INJECTION COOLING TIME (SECONDS) | 11.5 | 21.0 | 31.0 | 41.0 |
| INJECTION TIME (SECONDS) | 6.5 | 11.5 | 17.0 | 22.5 |
| COOLING TIME (SECONDS) | 5.0 | 9.5 | 14.0 | 18.5 |
| CYCLE (SECONDS) | 14.7 | 24.2 | 34.2 | 44.2 |
| STRETCH START TIME (SECONDS) | 0 | 0 | 2.0 | 2.0 |
| STATE OF PREFORM | GOOD | GOOD | GOOD | GOOD |
| STATE OF MOLDED PRODUCT (CONTAINER) | GOOD | GOOD | SLIGHTLY POOR IN SHAPE | POOR IN SHAPE |
| TRANSPARENCY OF MOLDED PRODUCT (CONTAINER) | TRANSPARENT | TRANSPARENT | TRANSPARENT | TRANSPARENT |

(Test)

Haze is obtained as the transparency. A test method for measuring a haze value is as follows.

- test standards: according to JIS K7136 (HAZE); 2000
- tester: haze meter HM-150 (manufactured by Murakami Color Research Laboratory)
- light source: D65
- the number of test (the number of samples): n=5
- irradiation surface: from outside
- testing environment: 23° C., 50% RH (RH: relative humidity)

TABLE 4

(Haze)

| SAMPLE | n 1 | 2 | 3 | 4 | 5 | AVERAGE AVE | STANDARD DEVIATION SD |
|---|---|---|---|---|---|---|---|
| (1) | 1.08 | 1.45 | 1.08 | 1.08 | 1.17 | 1.17 | 0.16 |
| (2) | 1.27 | 1.87 | 1.08 | 0.94 | 1.08 | 1.25 | 0.37 |
| (3) | 1.81 | 2.17 | 2.63 | 1.62 | 1.48 | 1.94 | 0.46 |
| (4) | 4.19 | 4.57 | 3.65 | 4.95 | 3.63 | 4.20 | 0.58 |
| (2)-2 | 1.13 | 1.13 | 1.31 | 1.22 | 0.94 | 1.14 | 0.14 |
| (2)-4 | 1.12 | 1.08 | 1.12 | 1.03 | 1.07 | 1.08 | 0.04 |
| (2)-6 | 1.35 | 1.21 | 1.26 | 1.26 | 1.21 | 1.26 | 0.06 |
| (2)-10 | 2.44 | 2.30 | 2.35 | 2.48 | 2.44 | 2.40 | 0.07 |
| (2)-15 | 3.70 | 3.06 | 3.48 | 3.07 | 3.34 | 3.33 | 0.27 |
| (2)-20 | 3.33 | 3.37 | 3.56 | 3.56 | 3.61 | 3.49 | 0.13 |

(NOTE)
NOTATION OF TEN MOLDING CONDITIONS OF SAMPLES (CONTAINERS) IS REPRESENTED IN ACCORDANCE WITH NOTATION OF MOLDING CONDITIONS OF TABLE 1.

TABLE 3

(CHANGE OF TRANSPASENCY OF MOLDED PRODUCT, WHEN STRETCH START TIME IS DELAYED IN MOLDING CONDITION (2)) SIX CONDITIONS

| | MOLDING CONDITION (2)-2 | MOLDING CONDITIONS (2)-4 | MOLDING CONDITION (2)-6 | MOLDING CONDITION (2)-10 | MOLDING CONDITION (2)-15 | HOLDING CONDITION (2)-20 |
|---|---|---|---|---|---|---|
| TOTAL INJECTION COOLING TIME (SECONDS) | 21.0 | 21.0 | 21.0 | 21.0 | 21.0 | 21.0 |
| INJECTION TIME (SECONDS) | 11.5 | 11.5 | 11.5 | 11.5 | 11.5 | 11.5 |
| COOLING TIME (SECONDS) | 9.5 | 9.5 | 9.5 | 9.5 | 9.5 | 9.5 |
| CYCLE (SECONDS) | 24.2 | 24.2 | 24.2 | 24.2 | 24.2 | 24.2 |
| STRETCH START TIME (SECONDS) | 2.0 | 4.0 | 6.0 | 10.0 | 15.0 | 20.0 |
| TRANSPARSENCY | TRANSPARENT | TRANSPARENT | TRANSPARENT | TRANSPARENT | TRANSPARENCY IS REDUCED | TRANSPARSNCY IS REDUCED |

When molding the aforementioned molded product by an injection stretch blow molding machine having a conventional structure, the injection cooling time (total time) is 42 seconds. Thus, it was found in advance that the aforementioned molding condition (4) corresponded to the case of molding the molded product by the injection stretch blow molding machine having the conventional structure.

The lower the haze value of a sample, the higher transparency is. It is apparent from the above Table 4 that, when the injection stretch blow molding machine having the above-described structure according to the embodiments performs molding, a reduction of the injection cooling time, in other words, an acceleration of ascent timing of the core mold and a removal of the product at a high temperature serves to improve the transparency of the molded product, in comparison with the molding condition (4) corresponding to the conventional manufacturing method.

As shown in Table 1, it was found that a reduction of the injection cooling time was extremely effective at reducing a molding cycle and thus improving molding efficiency, in molding by the injection stretch blow molding machine having the above-described structure.

REFERENCE SIGNS LIST 1 injection stretch blow molding machine
2 injection molding unit
3 stretch blow molding unit
4 ejection unit
5 rotating plate unit
6 lip mold
7 rotating plate
8 cavity mold
9 core mold
10 injection molding mold
12 stretch blow mold
18 preform formation space
18a center line of preform formation space
19 preform mouth portion forming portion
19a upper end position of preform mouth portion forming portion
20 preform body forming portion
21 preform bottom forming portion
22 preform mouth portion inner surface forming portion of core mold
23 preform body inner surface forming portion of core mold
24 preform bottom inner surface forming portion of core mold
25 diameter enlarging portion
26 core mold outer peripheral surface of diameter enlarging portion
27 core mold outer peripheral surface of preform body inner surface forming portion
30 preform
31 preform mouth portion
32 preform body
33 preform bottom
34 skin layer
35 middle layer
39 stress dispersion surface portion
41 upper end surface of preform mouth portion 31
43 cylindrical portion

The invention claimed is:

1. An injection molding mold formed in an injection molding unit of an injection stretch blow molding machine including: a rotating plate unit having a rotating plate and stopping whenever the rotating plate rotates at a constant rotation angle and ascending or descending; and an injection molding unit that is disposed under the rotating plate unit, wherein
(i) the injection molding mold includes
a cavity mold,
a lip mold for molding an outer peripheral surface of a preform mouth portion, the lip mold disposed on a bottom surface of the rotating plate and configured to descend toward the cavity mold together with the rotating plate unit when it is situated in a position corresponding to the injection molding unit by rotation of the rotating plate, and
a core mold that ascends and descends insertably into the cavity mold through the cavity mold and the lip mold to form a preform formation space enclosed by the lip mold, the cavity mold, and the core mold,
(ii) the preform formation space is formed from
a preform mouth portion forming portion,
a preform body forming portion that is continuous with the preform mouth portion forming portion and has a gap width uniform and wider than a gap width of the preform mouth portion forming portion, and
a preform bottom forming portion that is continuous with the preform body forming portion and has a lower end located on a side of a gate,
(iii) the core mold includes
a preform mouth portion inner surface forming portion corresponding to the preform mouth portion forming portion,
a preform body inner surface forming portion corresponding to the preform body forming portion,
a preform bottom inner surface forming portion corresponding to the preform bottom forming portion, and
a diameter enlarging portion in which a diameter of the core mold is gradually enlarged from the preform body inner surface forming portion to the preform mouth portion inner surface forming portion,
(iv) in the diameter enlarging portion, a core mold outer peripheral surface is tapered so as to be inclined outward relative to a position of an upper extension line along the core mold outer peripheral surface in the preform body inner surface forming portion,
(v) the core mold outer peripheral surface in the diameter enlarging portion is continuous between the preform body inner surface forming portion and a portion of the preform mouth portion inner surface forming portion facing the lip mold, and
(vi) the core mold outer peripheral surface in the diameter enlarging portion is inclined such that an upward extension line along the core mold outer peripheral surface of the diameter enlarging portion intersects an upper end position of the preform mouth portion forming portion, and the diameter enlarging portion extends through a height position of a parting line between the cavity mold and the lip mold.

2. A preform molding method comprising:
injecting a resin into the injection molding mold for an injection stretch blow molding machine according to claim 1;
molding a preform having a skin layer formed in a surface layer of the resin charged into the preform formation space by cooling due to contact with the injection molding mold, the skin layer having a lower temperature than a middle layer of the charged resin, wherein
a stress dispersion surface portion is formed in a portion of the charged resin corresponding to the diameter enlarging portion of the core mold, and in the stress dispersion surface portion, a diameter of the skin layer having the lower temperature than the middle layer due to contact with the diameter enlarging portion is enlarged upward in a tapered manner, and the stress dispersion surface portion is inclined such that an upward extension line along the stress dispersion surface portion intersects a position of an upper end surface of the preform mouth portion.

3. The preform molding method according to claim 2, wherein the stress dispersion surface portion is formed continuously so as to extend between the preform body forming portion on the side of the core mold of the preform formation space and the preform mouth portion forming portion on the side of the core mold.

4. The preform molding method according to claim 2, wherein the stress dispersion surface portion prevents an ascent of the resin charged into the preform body forming portion by being associated with an ascent of the core mold due to mold opening.

5. A container molding method comprising molding a container from a preform obtained with the injection molding mold according to claim 1 using an injection stretch blow molding machine.

6. The container molding method according to claim 5, wherein the diameter enlarging portion of the core mold is provided so as to extend between a portion of the preform body inner surface forming portion facing the cavity mold and a portion of the preform mouth portion inner surface forming portion facing the lip mold through a height position of a parting line between the cavity mold and the lip mold.

* * * * *